United States Patent
Brown et al.

(10) Patent No.: US 8,691,897 B2
(45) Date of Patent: Apr. 8, 2014

(54) THERMOPLASTIC ELASTOMER COMPOSITIONS COMPRISING INTUMESCENT FLAME RETARDANTS AND NON-PHOSPHOROUS-BASED FLAME RETARDANT SYNERGISTS

(75) Inventors: Geoffrey D. Brown, Bridgewater, NJ (US); Robert F. Eaton, Belle Mead, NJ (US); Manish Mundra, Somerset, NJ (US)

(73) Assignee: Union Carbide Chemicals & Plastics Technology LLC, Midland, MI (US)

( * ) Notice: Subject to any disclaimer, the term of this patent is extended or adjusted under 35 U.S.C. 154(b) by 0 days.

(21) Appl. No.: 13/388,620

(22) PCT Filed: Aug. 2, 2010

(86) PCT No.: PCT/US2010/044111
§ 371 (c)(1),
(2), (4) Date: Feb. 2, 2012

(87) PCT Pub. No.: WO2011/019536
PCT Pub. Date: Feb. 17, 2011

(65) Prior Publication Data
US 2012/0125657 A1    May 24, 2012

Related U.S. Application Data

(60) Provisional application No. 61/232,548, filed on Aug. 10, 2009.

(51) Int. Cl.
- C08K 5/521 (2006.01)
- C08K 3/22 (2006.01)
- H01B 3/30 (2006.01)

(52) U.S. Cl.
CPC . *C08K 3/22* (2013.01); *C08K 5/521* (2013.01); *H01B 3/302* (2013.01)
USPC .............................. 524/145; 524/115; 524/140

(58) Field of Classification Search
USPC .......................................... 524/115, 140, 145
See application file for complete search history.

(56) References Cited

U.S. PATENT DOCUMENTS

| | | | |
|---|---|---|---|
| 4,385,133 A | 5/1983 | Alberino et al. | |
| 4,522,975 A | 6/1985 | O'Connor et al. | |
| 4,843,116 A * | 6/1989 | Bopp | 524/102 |
| 4,857,600 A | 8/1989 | Gross et al. | |
| 4,900,768 A * | 2/1990 | Abolins et al. | 524/141 |
| 5,167,899 A | 12/1992 | Jezic | |
| 5,272,236 A | 12/1993 | Lai et al. | |
| 5,278,272 A | 1/1994 | Lai et al. | |
| 5,575,965 A | 11/1996 | Caronia et al. | |
| 5,837,760 A | 11/1998 | Hackl et al. | |
| 5,986,028 A | 11/1999 | Lai et al. | |
| 6,404,971 B2 | 6/2002 | Mehl | |
| 2001/0051695 A1 | 12/2001 | Crump | |
| 2006/0151758 A1 | 7/2006 | Reyes | |
| 2007/0221890 A1 | 9/2007 | Gan | |
| 2008/0132615 A1 | 6/2008 | Peerlings et al. | |
| 2008/0206468 A1 * | 8/2008 | Klei et al. | 427/318 |
| 2010/0256285 A1 | 10/2010 | Zhao et al. | |
| 2012/0065307 A1 * | 3/2012 | Cogen et al. | 524/127 |

FOREIGN PATENT DOCUMENTS

| | | |
|---|---|---|
| CN | 101058669 A | 10/2007 |
| EP | 1719800 | 11/2006 |
| EP | 1953193 | 8/2008 |
| JP | 2000265054 A * | 9/2000 |
| WO | 2004/044049 | 5/2004 |
| WO | 2005015576 A1 | 2/2005 |
| WO | 2007/031450 | 3/2007 |
| WO | 2008/106363 | 9/2008 |
| WO | WO 2009023131 A2 * | 2/2009 |

OTHER PUBLICATIONS

Machine translated English equivalent of JP 2000-265054 (Sep. 2000, 13 pages).*

Cytec (Asian Plastics Compounder Improves Product Quality and Meets Auto Specifications with CYASORB Light Stabilizers. Polymer Additives. Cytec Industries Inc. Mar. 30, 2007, 2 pages).*

* cited by examiner

*Primary Examiner* — Ling Choi
*Assistant Examiner* — Brieann R Fink
(74) *Attorney, Agent, or Firm* — Whyte Hirschboeck Dudek S.C.

(57) ABSTRACT

Compositions comprising a thermoplastic elastomer, e.g., a polyurethane, a nitrogen and/or phosphorus-based, intumescent flame retardant, e.g., a polyphosphate, a non-phosphorus-based burn synergist, e.g., carbon black or a metal oxide, and an optional olefin polymer, EVA are provided. Color-stable, halogen-free, flame retardant compositions comprising a thermoplastic elastomer polymer, a phosphorus-based flame retardant, at least 3 weight percent TiO2 and a UV stabilizer are also provided.

11 Claims, No Drawings

THERMOPLASTIC ELASTOMER COMPOSITIONS COMPRISING INTUMESCENT FLAME RETARDANTS AND NON-PHOSPHOROUS-BASED FLAME RETARDANT SYNERGISTS

CROSS REFERENCE TO RELATED APPLICATION

This claims the benefit of U.S. Provisional Application No. 61/232,548 filed Aug. 10, 2009, the contents of which are herein incorporated by reference in its entirety.

FIELD OF THE INVENTION

This invention relates to flame retardant compositions. In one aspect, the invention relates to flame retardant compositions free of halogen while in another aspect, the invention relates to flame retardant compositions comprising a thermoplastic elastomer, an intumescent flame retardant and a flame retardant synergist.

BACKGROUND OF THE INVENTION

Thermoplastic elastomer (TPE) compositions based upon polyurethane or polyester elastomers are well known and are used in many industrial applications including wire and cable coverings, e.g., insulated wires and protective cable jackets. To be useful as a wire and cable covering, these polyurethane or polyester based elastomers must exhibit, among other things, good mechanical properties, e.g., good elasticity and tensile strength, extrudability, flame retardancy and competitive cost. These polyurethane and polyester type thermoplastic elastomers inherently possess good elasticity and mechanical strength, but they are not inherently flame retardant and they are not low cost relative to many other polymers, e.g., many polyolefins.

Flame retardancy can be imparted to these elastomers by admixing it with one or more flame retardants. Many flame retardants comprise halogen functionality or one or more halogen compounds. While these additives impart desirable flame-resistant properties to the TPU, they are also prone to release toxic gases upon ignition. Consequently, flame retardants that do not contain halogen functionality or halogen compounds are often favored over those flame retardants that do contain such halogen functionality or compounds.

One such class of halogen-free flame retardants that have been admixed with thermoplastic polyurethanes and polyester elastomers is the intumescent-type flame retardants. A wide range of these intumescent flame retardant additives are available, they typically include phosphorus and/or nitrogen based constituents to provide the char forming flame retardant characteristics. There is good value in identifying co-agents providing synergistic flame retardant benefit allowing a reduced intumescent additive loading, since these intumescent flame retardant materials can be costly and can involve trade-offs on other key properties.

To lower the cost of a cable covering comprising a thermoplastic polyurethane or polyester elastomer, it may be possible to include a lower cost polymer component, e.g., a polyolefin. However, the combination of thermoplastic polyurethane or polyester elastomer, polyolefin and phosphorus-based flame retardant often yields a composition with reduced mechanical properties relative to the TPU alone or the TPU/polyolefin blend, particularly when the phosphorus-based flame retardant is present at a relatively high loading, e.g., in excess of 40 weight percent based on the combined weight of TPU, polyolefin and flame retardant.

Moreover, if the cable covering is colored, then the thermoplastic polyurethane or polyester elastomers are typically also admixed with a colorant, e.g., carbon black for black or titanium dioxide for white. However, these colorants, particularly carbon black, can add to the fuel load of the TPU admixture and thus reduce the flame retardancy of the admixture.

EP 1 719 800 teaches a flame retardant composition comprising piperazine and melamine treated with silicone oil in combination with a (poly/pyro)phosphate compound. The flame retardant composition can be admixed with various synthetic resins including polyolefins, polyurethanes or polyesters.

Patent Application Publication US 2007/0221890 teaches phosphorus-containing compounds that are formed by reacting (A) an organophosphorus compound having a group selected from the group H—P=O, the group P—H and the group P—OH, and (B) a compound of a complex, specified formula. The compounds are useful for imparting flame retardancy to epoxy and polyurethane resins.

Patent Application Publication US 2006/0151758 teaches compositions comprising intumescent flame retardants in combination with a plastic resin. The compositions are useful as wire and cable jacketing and insulation. Plastic resins include polyolefins, engineering resins and thermoset resins.

WO 2007/031450 teaches flame retardant compositions comprising (a) at least one ester of a phosphorus-containing oxo acid, (b) at least one flame retardant component based on a nitrogen compound, e.g., melamine cyanurate, and (c) a polyurethane polymer base. The polyurethane polymer base can contain a polyolefin, and the composition can be used for cable coverings.

U.S. Pat. No. 5,837,760, Patent Application Publication US 2008/0132615 and JP 2001/261855 all teach flame retardant compositions comprising a TPU and a phosphorus-containing compound. JP 2001/261855 also teaches that the composition contains an ethylene-based thermoplastic elastomer, e.g., ethylene vinyl acetate.

Accordingly, of continuing interest is a TPU/olefin-polymer composition that comprises a phosphorus-based flame retardant and that is free of halogen. Moreover, the composition should exhibit sufficiently good mechanical and flame retardant properties, even at high flame retardant loadings, so as to be useful in wire and cable applications.

BRIEF SUMMARY OF THE INVENTION

One aspect of the invention provides a composition comprising (A) a thermoplastic elastomer, (B) a nitrogen and/or phosphorus-based, intumescent flame retardant, (C) a non-phosphorus-based flame retardant synergist, and (D) an optional olefin polymer. In some embodiments, the thermoplastic elastomer is a polyurethane or a polyester, and it comprises at least 20 weight percent (wt. %) of the composition. In some embodiments, the nitrogen and/or phosphorus intumescent flame retardant comprises at least 10 wt % of the composition. In some embodiments, the non-phosphorus-based burn synergist comprises at least 2 wt % of the composition. In one embodiment, the optional olefin polymer is present and comprises at least 2 weight percent wt % of the composition.

In some embodiments, the thermoplastic polyurethane is PELLETHANE® 2102, 2103 and/or 2355. In some embodiments, the intumescent phosphorus-based flame-retardant is one or more of melamine or a melamine derivative (e.g., melamine pyrophosphate), an organic phosphonic acid, phosphonate, phosphinate, phosphonites, phosphinite, phosphine oxide, phosphine, phosphite or phosphate, resorcinol diphosphate, phosphorus ester amide, phosphoric acid amide, phosphonic acid amide and phosphinic acid amide. In some embodiments, the non-phosphorus-based burn synergist is one or more of titanium dioxide, antimony oxide and carbon black. In some embodiments, the olefin polymer is a polar olefin polymer, e.g., ethylene vinyl acetate.

In some embodiments, the invention is an article made from a composition comprising (A) a thermoplastic elastomer, (B) a nitrogen and/or phosphorus-based, intumescent flame retardant; (C) a non-phosphorus-based burn synergist, and (D) an optional olefin polymer. In some embodiments, the article is a cable sheath, e.g., an insulation covering, protective jacket, etc.

Another aspect of the invention provides a color-stable, halogen-free, flame retardant composition comprising, based on the weight of the composition, 20-85 weight percent of a thermoplastic elastomer polymer; 5-60 weight percent of a phosphorus-based flame retardant, at least 3 weight percent $TiO_2$ and a UV stabilizer, the composition having a CIE 94 E of no greater than 3 after 300 hours of exposure to a xenon arc lamp according to ASTM-D-4459-06. This includes embodiments in which the composition comprises 3-15 weight percent TiO2 and further comprises embodiments in which the composition comprises at least about 4.5 weight percent and at least 8 weight percent $TiO_2$, based on the total weight of the composition.

In one embodiment, the thermoplastic polymer comprises thermoplastic polyurethane.

In one embodiment, the phosphorus-based flame retardant is a phosphoric acid ester. In this and other embodiments, the thermoplastic polyurethane can be an aromatic polyurethane.

In some embodiments, the compositions are characterized by a 5% secant modulus of no greater than about 16,000 psi. This includes embodiments in which the compositions have a 5% secant modulus of no greater than about 12,000 psi, and further includes embodiments in which the compositions have a 5% secant modulus of no greater than 9,000 psi.

In some embodiments, the compositions include an olefin-based polymer which can comprise, for example, up to 40% by weight percent of an olefin-based polymer.

DETAILED DESCRIPTION OF THE PREFERRED EMBODIMENT

All references to the Periodic Table of the Elements refer to the Periodic Table of the Elements published and copyrighted by CRC Press, Inc., 2003. Also, any references to a Group or Groups shall be to the Group or Groups reflected in this Periodic Table of the Elements using the IUPAC system for numbering groups. Unless stated to the contrary, implicit from the context, or customary in the art, all parts and percents are based on weight and all test methods are current as of the filing date of this disclosure. For purposes of U.S. patent practice, the contents of any referenced patent, patent application or publication are incorporated by reference in their entirety (or its equivalent US version is so incorporated by reference) especially with respect to the disclosure of synthetic techniques, product and processing designs, polymers, catalysts, definitions (to the extent not inconsistent with any definitions specifically provided in this disclosure), and general knowledge in the art.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, viscosity, melt index, etc., is from 100 to 1,000, then the intent is that all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, the amounts of polyolefin, TPU, flame retardants and additives in the composition, and the various characteristics and properties by which these components are defined.

As used with respect to a chemical compound, unless specifically indicated otherwise, the singular includes all isomeric forms and vice versa (for example, "hexane", includes all isomers of hexane individually or collectively). The terms "compound" and "complex" are used interchangeably to refer to organic-, inorganic- and organometal compounds. The term, "atom" refers to the smallest constituent of an element regardless of ionic state, that is, whether or not the same bears a charge or partial charge or is bonded to another atom. The term "amorphous" refers to a polymer lacking a crystalline melting point as determined by differential scanning calorimetry (DSC) or equivalent technique.

The term "or", unless stated otherwise, refers to the listed members individually as well as in any combination.

"Composition" and like terms mean a mixture or blend of two or more components.

"Blend," "polymer blend" and like terms mean a blend of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art.

"Polymer" means a polymeric compound prepared by polymerizing monomers, whether of the same or a different type. The generic term polymer thus embraces the term homopolymer, usually employed to refer to polymers prepared from only one type of monomer, and the term interpolymer as defined below. It also embraces all forms of interpolymers, e.g., random, block, homogeneous, heterogeneous, etc. The terms "ethylene/α-olefin polymer" and "propylene/α-olefin polymer" are indicative of interpolymers as described below.

"Interpolymer" means a polymer prepared by the polymerization of at least two different monomers. This generic term includes copolymers, usually employed to refer to polymers prepared from two different monomers, and polymers prepared from more than two different monomers, e.g., terpolymers, tetrapolymers, etc.

"Olefin polymer", "olefinic polymer", "olefinic interpolymer", "polyolefin" and like terms mean a polymer derived from simple olefins. Representative polyolefins include polyethylene, polypropylene, polybutene, polyisoprene and their various interpolymers.

"Ethylene polymer", "polyethylene" and like terms mean a polymer containing units derived from ethylene. Ethylene polymers typically comprises at least 50 mole percent (mol %) units derived from ethylene.

"Halogen-free" and like terms mean that the compositions of this invention are without or substantially without halogen content, i.e., contain less than 2000 mg/kg of halogen as measured by ion chromatography (IC) or a similar analytical method. Halogen content of less than this amount is considered inconsequential to the efficacy of the composition as a wire or cable covering.

"Color stable," For the purposes of this disclosure, a composition is "color stable" if the color of the composition of this invention exhibits a CIE Delta ($\Delta$) E of no greater than 3.0 after 300 hours of exposure to xenon arc light source simulating direct sunlight exposure through window glass. This testing is in accordance with ASTM D4459-06 using an Atlas Ci5000 Xenon Weather-Ometer® with a Type "S" borosilicate inner filter and a soda lime outer filter. This light source was calibrated to an energy input of 0.8 watts per square meter ($W/m^2$) at the specified 420 nm calibration wavelength.

Olefin Polymers

These thermoplastic polymers include both olefin homopolymers and interpolymers. Examples of olefin homopolymers are the homopolymers of ethylene and propylene. Examples of the olefin interpolymers are the ethylene/$\alpha$-olefin interpolymers and the propylene/$\alpha$-olefin interpolymers. The $\alpha$-olefin is preferably a $C_{3-20}$ linear, branched or cyclic $\alpha$-olefin (for the propylene and high olefin/$\alpha$-olefin interpolymers, ethylene is considered an $\alpha$-olefin). Examples of $C_{3-20}$ $\alpha$-olefins include propene, 1-butene, 4-methyl-1-pentene, 1-hexene, 1-octene, 1-decene, 1-dodecene, 1-tetradecene, 1-hexadecene, and 1-octadecene. The $\alpha$-olefins can also contain a cyclic structure such as cyclohexane or cyclopentane, resulting in an $\alpha$-olefin such as 3-cyclohexyl-1-propene (allyl cyclohexane) and vinyl cyclohexane. Although not $\alpha$-olefins in the classical sense of the term, for purposes of this invention certain cyclic olefins, such as norbornene and related olefins, are $\alpha$-olefins and can be used in place of some or all of the $\alpha$-olefins described above. Similarly, styrene and its related olefins (for example, $\alpha$-methylstyrene, etc.) are $\alpha$-olefins for purposes of this invention. Illustrative polyolefin copolymers include ethylene/propylene, ethylene/butene, ethylene/1-hexene, ethylene/1-octene, ethylene/styrene, and the like. Illustrative terpolymers include ethylene/propylene/1-octene, ethylene/propylene/butene, ethylene/butene/1-octene, and ethylene/butene/styrene. The copolymers can be random or blocky.

More specific examples of olefin interpolymers useful in this invention include very low density polyethylene (VLDPE) (e.g., FLEXOMER® ethylene/1-hexene polyethylene made by The Dow Chemical Company), homogeneously branched, linear ethylene/$\alpha$-olefin copolymers (e.g. TAFMER® by Mitsui Petrochemicals Company Limited and EXACT® by Exxon Chemical Company), homogeneously branched, substantially linear ethylene/$\alpha$-olefin polymers (e.g., AFFINITY® and ENGAGE® polyethylene available from The Dow Chemical Company), and olefin block copolymers such as those described in U.S. Pat. No. 7,355,089 (e.g., INFUSE® available from The Dow Chemical Company). The more preferred polyolefin copolymers are the homogeneously branched linear and substantially linear ethylene copolymers. The substantially linear ethylene copolymers are especially preferred, and are more fully described in U.S. Pat. Nos. 5,272,236, 5,278,272 and 5,986,028.

The olefin copolymers of this category of thermoplastic polymers also include propylene, butene and other alkene-based copolymers, e.g., copolymers comprising a majority of units derived from propylene and a minority of units derived from another $\alpha$-olefin (including ethylene). Exemplary propylene polymers useful in the practice of this invention include the VERSIFY® polymers available from The Dow Chemical Company, and the VISTAMAXX® polymers available from ExxonMobil Chemical Company.

Preferred olefin polymers for use in the practice of this invention are polar olefin polymers, i.e., olefin polymers containing one or more polar groups (sometimes referred to as polar functionalities). For purposes of this invention, a polar group is any group that imparts a bond dipole moment to an otherwise essentially nonpolar olefin molecule. Exemplary polar groups include carbonyls, carboxylic acid groups, carboxylic acid anhydride groups, carboxylic ester groups, vinyl ester groups, epoxy groups, sulfonyl groups, nitrile groups, amide groups, silane groups and the like, and these groups can be introduced into the olefin polymer either through grafting or copolymerization. Exemplary polar olefin polymers include ethylene/acrylic acid (EAA), ethylene/methacrylic acid (EMA), ethylene/acrylate or methacrylate, ethylene/vinyl acetate (EVA), poly(ethylene-co-vinyltrimethoxysilane) copolymer, and maleic anhydride- or silane-grafted olefin polymers. Preferred polar olefin polymers include DuPont ELVAX ethylene vinyl acetate (EVA) resins, AMPLIFY ethylene ethyl acrylate (EEA) copolymer from The Dow Chemical Company, PRIMACOR ethylene/acrylic acid copolymers from The Dow Chemical Company, and SI-LINK poly(ethylene-co-vinyltrimethoxysilane) copolymer from The Dow Chemical Company.

Blends of one or more of the olefinic polymers, including all of the examples listed above, can also be used in this invention in combination with the thermoplastic polyester and polyurethane elastomer components.

The optional olefin polymers useful in the practice of this invention, if present, are typically used in amounts ranging from 2 to 40 wt % based on the weight of the composition. Preferably, if present the olefin polymers are used in an amount ranging from 4 to 35, more preferably from 5 to 30, wt % based on the weight of the composition.

Thermoplastic Elastomer (TPE)

A "thermoplastic elastomer," as used herein, is a polymer (1) that has the ability to be stretched beyond its original length and retract to substantially its original length when released and (2) softens when exposed to heat and returns to substantially its original condition when cooled to room temperature. Nonlimiting examples of suitable thermoplastic elastomers include styrene block copolymers, thermoplastic polyurethane ("TPU"), thermoplastic copolyester, polyester block ether, polybutylene terephthalate/polytetramethylene glycol ether copolymer (PBT/PTMEG copolymer), and any combination thereof. Nonlimiting commercial examples of thermoplastic elastomers include products under the trade names Styroflex™ (BASF), Kraton™ (Kraton Polymers), Pellethane™ (Dow Chemical), Pebax™, Arnitel™ (DSM), and Hytrel™ (Du Pont).

In an embodiment, the thermoplastic elastomer is a thermoplastic polyurethane. A "thermoplastic polyurethane" (or "TPU"), as used herein, is the reaction product of a di-isocyanate, one or more polymeric diol(s), and optionally one or more difunctional chain extender(s). The TPU may be prepared by the prepolymer, quasi-prepolymer, or one-shot methods. The di-isocyanate forms a hard segment in the TPU and may be an aromatic, an aliphatic, and a cycloaliphatic di-isocyanate and combinations of two or more of these compounds. A nonlimiting example of a structural unit derived from di-isocyanate (OCN—R—NCO) is represented by formula (I) below:

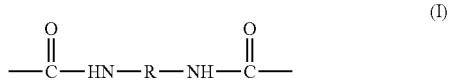

(I)

in which R is an alkylene, cycloalkylene, or arylene group. Representative examples of these di-isocyanates can be found in U.S. Pat. Nos. 4,385,133, 4,522,975 and 5,167,899. Nonlimiting examples of suitable di-isocyanates include 4,4'-di-isocyanatodipheny-lmethane, p-phenylene di-isocyanate, 1,3-bis(isocyanatomethyl)-cyclohexane, 1,4-di-isocyanato-cyclohexane, hexamethylene di-isocyanate, 1,5-naphthalene di-isocyanate, 3,3'-dimethyl-4,4'-biphenyl di-isocyanate, 4,4'-di-isocyanato-dicyclohexylmethane, 2,4-toluene di-isocyanate, and 4,4'-di-isocyanato-diphenylmethane.

Suitable classes of organic diisocyanates include the aromatic diisocyanates. For example, the organic diisocyanate can be methylene bis(phenyl isocyanate) including the 4,4'-isomer, the 2,4'-isomer, and mixtures thereof. Although aromatic TPUs made from such aromatic diisocyanates have not found use in color-stable flame retardant compositions in the past, due to their poor color (e.g., UV) stability. The inventors have surprisingly discovered that aromatic TPUs can be used in the present color-stable compositions.

The polymeric diol forms soft segments in the resulting TPU. The polymeric diol can have a molecular weight (number average) in the range, for example, from 200 to 10,000 g/mole. More than one polymeric diol can be employed. Nonlimiting examples of suitable polymeric diols include polyether diols (yielding a "polyether TPU"); polyester diols (yielding a "polyester TPU"); hydroxy-terminated polycarbonates (yielding a "polycarbonate TPU"); hydroxy-terminated polybutadienes; hydroxy-terminated polybutadiene-acrylonitrile copolymers; hydroxy-terminated copolymers of dialkyl siloxane and alkylene oxides, such as ethylene oxide, propylene oxide; natural oil diols, and any combination thereof. One or more of the foregoing polymeric diols may be mixed with an amine-terminated polyether and/or an amino-terminated polybutadiene-acrylonitrile copolymer.

The difunctional chain extender can be aliphatic straight and branched chain diols having from 2 to 10 carbon atoms, inclusive, in the chain. Illustrative of such diols are ethylene glycol, 1,3-propanediol, 1,4-butanediol, 1,5-pentanediol, 1,6-hexanediol, neopentyl glycol, and the like; 1,4-cyclohexanedimethanol; hydroquinonebis-(hydroxyethyl)ether; cyclohexylenediols (1,4-, 1,3-, and 1,2-isomers), isopropylidenebis(cyclohexanols); diethylene glycol, dipropylene glycol, ethanolamine, N-methyl-diethanolamine, and the like; and mixtures of any of the above. As noted previously, in some cases, minor proportions (less than about 20 equivalent percent) of the difunctional extender may be replaced by trifunctional extenders, without detracting from the thermoplasticity of the resulting TPU; illustrative of such extenders are glycerol, trimethylolpropane, and the like.

The chain extender is incorporated into the polyurethane in amounts determined by the selection of the specific reactant components, the desired amounts of the hard and soft segments, and the index sufficient to provide good mechanical properties, such as modulus and tear strength. The polyurethane compositions can contain, for example, from 2 to 25, preferably from 3 to 20 and more preferably from 4 to 18, wt % of the chain extender component.

Optionally, small amounts of monohydroxyl functional or monoamino functional compounds, often termed "chain stoppers," may be used to control molecular weight. Illustrative of such chain stoppers are the propanols, butanols, pentanols, and hexanols. When used, chain stoppers are typically present in minor amounts from 0.1 to 2 weight percent of the entire reaction mixture leading to the polyurethane composition.

The equivalent proportions of polymeric diol to said extender can vary considerably depending on the desired hardness for the TPU product. Generally speaking, the equivalent proportions fall within the respective range of from about 1:1 to about 1:20, preferably from about 1:2 to about 1:10. At the same time the overall ratio of isocyanate equivalents to equivalents of active hydrogen containing materials is within the range of 0.90:1 to 1.10:1, and preferably, 0.95:1 to 1.05:1.

Additives may be used to modify the properties of the polyurethane used in the practice of this disclosure. Additives may be included in the conventional amounts as already known in the art and literature. Usually additives are used to provide specific desired properties to the polyurethanes such as various antioxidants, ultraviolet inhibitors, waxes, thickening agents and fillers. When fillers are used, they may be either organic or inorganic, but are generally inorganic such as clay, talc, calcium carbonate, silica and the like. Also, fibrous additives, such as glass or carbon fiber, may be added to impart certain properties.

Nonlimiting examples of suitable TPUs include the PELLETHANE™ thermoplastic polyurethane elastomers available from the Lubrizol Corporation; ESTANE™ thermoplastic polyurethanes, TECOFLEX™ thermoplastic polyurethanes, CARBOTHANE™ thermoplastic polyurethanes, TECOPHILICT™ thermoplastic polyurethanes, TECOPLAST™ thermoplastic polyurethanes, and TECOTHANE™ thermoplastic polyurethanes, all available from Noveon; ELASTOLLAN™ thermoplastic polyurethanes and other thermoplastic polyurethanes available from BASF; and additional thermoplastic polyurethane materials available from Bayer, Huntsman, Lubrizol Corporation, Merquinsa and other suppliers.

The polyurethane component of the compatibilized blends used in the practice of the invention may contain a combination of two or more suitable embodiments as described above.

The TPUs useful in the practice of this invention are typically used in amounts ranging from 20 to 90 wt % based on the weight of the composition. Preferably, the TPUs are used in an amount ranging from 20 to 75, more preferably from 25 to 60, wt % based on the weight of the composition.

Nitrogen and/or Phosphorus-Based Flame Retardant

The phosphorus-based and nitrogen-based intumescent flame retardants used in the practice of this invention include, but are not limited to, organic phosphonic acids, phosphonates, phosphinates, phosphonites, phosphinites, phosphine oxides, phosphines, phosphites or phosphates, phosphorus ester amides, phosphoric acid amides, phosphonic acid amides, phosphinic acid amides, and melamine and melamine derivatives, including melamine polyphosphate, melamine pyrophosphate and melamine cyanurate and mixtures of two or more of these materials. Examples include phenylbisdodecyl phosphate, phenylbisneopentyl phosphate, phenyl ethylene hydrogen phosphate, phenyl-bis-3,5,5'-trimethylhexyl phosphate), ethyldiphenyl phosphate, 2-ethylhexyl di(p-tolyl)phosphate, diphenyl hydrogen phosphate, bis(2-ethyl-hexyl)p-tolylphosphate, tritolyl phosphate, bis(2-ethylhexyl)-phenyl phosphate, tri(nonylphenyl)phosphate, phenylmethyl hydrogen phosphate, di(dodecyl)p-tolyl phosphate, tricresyl phosphate, triphenyl phosphate, triphenyl phosphate, dibutylphenyl phosphate, 2-chloroethyldiphenyl phosphate, p-tolyl bis(2,5,5'-trimethylhexyl)phosphate, 2-ethylhexyldiphenyl phosphate, and diphenyl hydrogen phosphate. Phosphoric acid esters of the type described in U.S. Pat. No. 6,404,971 are examples of phosphorus-based flame retardants. Ammonium polyphosphate is another example. The ammonium polyphosphate is often used with flame retardant co-additives, such as melamine derivatives. Additional co-additives, such as hydroxyl sources, can also be included to contribute to the intumescent flame retardant char forming mechanism. Budenheim and Adeka sell intumescent material blends such as Budenheim Budit 3167 (based on ammonium polyphosphate and co-additives) and Adeka FP-2100J (based on piperazine polyphosphate and co-additives).

Preferred intumescent flame retardant additives used in the demonstration of this invention include the Amfine FP-2100J (a nitrogen-phosphorous based flame retardant) and a combination of resorcinol diphosphate (Supresta RDP) and aluminum trihydrate. Other preferred flame retardants for polyurethane or polyester type TPE compositions include bisphenol A polyphosphate (also known as BAPP or BDP) and Budit 3167.

The phosphorus-based flame retardants useful in the practice of this invention are typically used in amounts ranging from 1 to 70 wt % based on the weight of the composition. Preferably, the phosphorus-based flame retardants are used in an amount ranging from 5 to 60, more preferably from 10 to 50, wt % based on the weight of the composition.

Non-Phosphorus-Based Burn Synergists

The TPE/intumescent flame retardant/optional olefin polymer blends of this invention exhibit excellent burn performance in combination with any one of a number of different non-phosphorus-based flame retardant synergists, particularly carbon black and/or one of the various metal oxides such as titanium dioxide, aluminum oxide, huntite, antimony trioxide, potassium oxide, zirconium oxide, zinc oxide, magnesium oxide, silicon dioxide (e.g., precipitated silica and silicates, fumed silica, etc.) and the like. These non-phosphorus-based flame retardant synergists can be used in amounts ranging from less than 0.5 to more than 40 wt % based on the weight of the composition. Typically, these additives are used in an amount ranging from 1 to 20, more typically from 2 to 10, wt % based on the weight of the composition.

Colorants

A spectrum of colorants (pigments or dyes or other substances used to impart hue and chroma to a composition or article) can be added to the compositions in order to impart them with a desired color. The colorants can be added directly at 100% strength to the composition during the melt compounding material production process, or can be introduced as a color concentrate pre-mixed into a base material for easier use and handling, such as the polymer based masterbatches that are commonly used in wire and cable. The color masterbatches can include several color components the targeted coloring, for example, combining black, white and blue pigments in the proper ratio to obtain certain hue of gray with a blue undertone. When colorants are used to color plastic compositions, they are typically added in amounts of about 0.2 (or less) to 1.0 weight percent, based on the total weight of the composition. For example, both titanium dioxide and carbon black are also commonly utilized at loadings of equal or less then 1.0% by weight for purposes of coloring, with titanium dioxide coloring component also acting as an opacifier to eliminate undesired translucence. Certain aspects of this invention are based, at least in part, on the discovery that some colorant materials such as carbon black and titanium dioxide, can provide additional functionality as flame retardant synergists and color stabilizers for UV exposure when included at higher loadings in thermoplastic compositions, including plastic polyurethane or polyester based intumescent compositions.

Carbon Black

Carbon black may serve as a colorant and a non-phosphorus-based burn synergist in the present compositions. This is illustrated in Example 1, below, in which a carbon black masterbatch polyolefin base resin and about 40% carbon black pigment loading are used as source for the carbon black additive. For the thermoplastic polyurethane based intumescent compositions used to demonstrate this invention, ethylene-vinyl acetate copolymer based color masterbatches have been found to be effective. For most flame retardant compositions such as polyolefin based compounds with metal hydrates, or polyethylene with halogen flame retardant such as decabromo-diphenyl oxide, the addition of colorant masterbatches tends to add fuel to the composition, and thereby dilute the flame retardant and weaken the burn performance of the composition. As described in Example 1, carbon black can surprisingly show the opposite effect.

Titanium Dioxide

Titanium dioxide can also serve multiple roles in the present compositions. For example, compositions with higher than conventional $TiO_2$ loadings can provide a balance of good mechanical properties with high burn resistance and color stability relative to prior flame resistant compositions for wire and coating applications. Such compositions contain $TiO_2$ in amounts substantially higher than those used or needed for typical coloring applications. At these high concentrations, the $TiO_2$ is acting not only as a colorant, but also as a UV stabilizer and as a flame retardant synergist providing burn resistance to the compositions. As a result the present compositions make it possible to achieve color stability even when the base resins and other components in the composition have poor UV stability. This makes it possible to substitute lower cost, less color-stable thermoplastics (e.g., aromatic TPUs) for higher cost, more color-stable thermoplastics without sacrificing the overall color stability of the compositions.

In some embodiments of the present compositions, the UV stability and the burn resistance are advantageously combined with good flexibility, as measured, for example, by their maximum secant moduli. Flexibility is an important property in applications such as sheathing for wires and cables where stiff materials are undesirable, and is particularly valued in certain market segments such as flexible wiring for consumer electronics. As such, embodiments of the present compositions can be distinguished from flame resistant coatings, such as paints, where a stiff composition is required. Flexible wire compositions are typically thermoplastic type which provides a simpler and lower cost wire fabrication process versus cross-linked compositions.

In some embodiments, the compositions include at least 3 weight percent $TiO_2$, based on the total weight of the compositions. This includes compositions containing at least 5 weight percent, at least 7 weight percent and at least 9 weight percent $TiO_2$, based on the total weight of the composition. The $TiO_2$ can be added to the composition directly as a powder or can be added in a concentrate form, such as polymer based masterbatch. For example, in some embodiments the compositions contain 3-15 weight percent $TiO_2$, based on the total weight of the composition. The examples contained herein show about 3 to 10 weight percent $TiO_2$, based on the total weight of the composition. Examples of commercially-available $TiO_2$ powders are sold by DuPont under the tradenames Ti-Pure® R-104 and R-350.

Additives and Fillers

The compositions of this invention may also contain additives and/or fillers. Representative additives include but are not limited to antioxidants, curing agents, cross linking co-agents, boosters and retardants, processing aids, coupling agents, ultraviolet stabilizers (including UV absorbers), anti-static agents, nucleating agents, slip agents, plasticizers, lubricants, viscosity control agents, tackifiers, anti-blocking agents, surfactants, extender oils, acid scavengers, and metal deactivators. These additives are typically used a conventional manner and in conventional amounts, e.g., from 0.01 wt % or less to 10 wt % or more based on the weight of the composition.

Representative fillers include but are not limited to the various metal hydroxides, e.g., magnesium hydroxide, potassium hydroxide and aluminum trihydroxide; metal carbonates such as magnesium carbonate and calcium carbonate; metal sulfides and sulfates such as molybdenum disulfide and barium sulfate; metal borates such as barium borate, metabarium borate, zinc borate and meta-zinc borate; metal anhydride such as aluminum anhydride; clay such as diatomite, kaolin and montmorillonite; huntite; celite; asbestos; ground minerals; and lithopone. These fillers are typically used a conventional manner and in conventional amounts, e.g., from 5 wt % or less to 50 wt % or more based on the weight of the composition.

Suitable UV light stabilizers include hindered amine light stabilizers (HALS) and UV light absorber (UVA) additives. Representative HALS that can be used in the compositions include, but are not limited to, TINUVIN XT 850, TINUVIN 622, TINUVIN® 770, TINUVIN® 144, SANDUVOR® PR-31 and Chimassorb 119 FL. TINUVIN® 770 is bis-(2,2,6,6-tetramethyl-4-piperidinyl)sebacate, has a molecular weight of about 480 grams/mole, is commercially available from Ciba, Inc. (now a part of BASF), and possesses two secondary amine groups. TINUVIN® 144 is bis-(1,2,2,6,6-pentamethyl-4-piperidinyl)-2-n-butyl-2-(3,5-di-tert-butyl-4-hydroxybenzyl)malonate, has a molecular weight of about 685 grams/mole, contains tertiary amines, and is also available from Ciba. SANDUVOR® PR-31 is propanedioic acid, [(4-methoxyphenyl)-methylene]-bis-(1,2,2,6,6-pentamethyl-4-piperidinyl)ester, has a molecular weight of about 529 grams/mole, contains tertiary amines, and is available from Clariant Chemicals (India) Ltd. Chimassorb 119 FL or Chimassorb 119 is 10 wt % of Dimethyl succinate polymer with 4-hydroxy-2,2,6,6,-tetramethyl-1-piperidineethanol and 90 wt % of N,N''''-[1,2-Ethanediylbis[[[4,6-bis[butyl(1,2,2,6,6-pentamethyl-4-piperidinyl)amino]-1,3,5-traizin-2-yl]imino]-3,1-propanediyl]]bis[N'N''-dibutyl-N'N''-bis(1,2,2,6,6-pentamethyl-4-piperidinyl)]-1, is commercially available from Ciba, Inc. Representative UV absorber (UVA) additives include benzotriazole types such as Tinuvin 326 and Tinuvin 328 commercially available from Ciba, Inc. Blends of HAL's and UVA additives are also effective.

In some embodiments, the light stabilizers are present in amounts of 0.1 to 5.0 weight percent, based on the total weight of the compositions. The embodiments represented by the examples shown herein include 1.0 to 2.0 weight percent of UV light stabilizer additives. For the purposes of this disclosure these light stabilizer ranges do not include the $TiO_2$, although it can act as a light stabilizer in the compositions.

Examples of antioxidants are as follows, but are not limited to: hindered phenols such as tetrakis[methylene(3,5-di-tert-butyl-4-hydroxyhydro-cinnamate)]methane; bis[(beta-(3,5-ditert-butyl-4-hydroxybenzyl)-methylcarboxyethyl)]sulphide, 4,4'-thiobis(2-methyl-6-tert-butylphenol), 4,4'-thiobis(2-tert-butyl-5-methylphenol), 2,2'-thiobis(4-methyl-6-tert-butylphenol), and thiodiethylene bis(3,5-di-tert-butyl-4-hydroxy)hydrocinnamate; phosphites and phosphonites such as tris(2,4-di-tert-butylphenyl)phosphite and di-tert-butylphenyl-phosphonite; thio compounds such as dilaurylthiodipropionate, dimyristylthiodipropionate, and distearylthiodipropionate; various siloxanes; polymerized 2,2,4-trimethyl-1,2-dihydroquinoline, n,n'-bis(1,4-dimethylpentyl-p-phenylenediamine), alkylated diphenylamines, 4,4'-bis(alpha,alpha-dim ethylbenzyl)diphenylamine, diphenyl-p-phenylenediamine, mixed di-aryl-p-phenylenediamines, and other hindered amine anti-degradants or stabilizers. Antioxidants can be used in amounts of 0.1 to 5 wt % based on the weight of the composition.

Examples of processing aids include but are not limited to metal salts of carboxylic acids such as zinc stearate or calcium stearate; fatty acids such as stearic acid, oleic acid, or erucic acid; fatty amides such as stearamide, oleamide, erucamide, or N,N'-ethylene bis-stearamide; polyethylene wax; oxidized polyethylene wax; polymers of ethylene oxide; copolymers of ethylene oxide and propylene oxide; vegetable waxes; petroleum waxes; non ionic surfactants; silicone fluids and polysiloxanes. Processing aids can be used in amounts of 0.05 to 5 wt % based on the weight of the composition.

Mechanical Properties

Secant modulus is the ratio of nominal stress to corresponding strain at any specified point on the stress-strain curve. It is determined by calculating the slope of a line drawn from the origin to a percent strain on a stress/strain curve. One percent (1%) secant modulus is the ratio of nominal stress to corresponding strain at the one percent strain on the stress-strain curve. Two percent (2%) secant modulus is the ratio of nominal stress to corresponding strain at the two percent strain on the stress-strain curve. Five percent (5%) secant modulus is the ratio of nominal stress to corresponding strain at the five percent strain on the stress-strain curve. Secant modulus is usually employed in place of modulus of elasticity for materials whose stress-strain diagram does not demonstrate a linear proportionality of stress to strain. Some embodiments of the present compositions are flexible materials having a 5% secant modulus of no greater than 16,000 psi. This includes compositions having a 5% secant modulus of no greater then 12,000 psi and further includes compositions having a 5% secant modulus of no greater than 9,000 psi.

Some embodiments of the present compositions have peak tensile strengths and/or tensile strengths at break of at least 1000 psi. This includes compositions having a peak tensile strength and/or tensile strength at break of at least 1200 psi and further includes compositions having a peak tensile strength and/or tensile strength at break of at least 1500 psi.

Some embodiments of the present compositions have an elongation at break of at least 200%. This includes compositions having an elongation at break of at least 300%.

Compositions

The compositions of this invention are thermoplastic, i.e., are capable of being repeatedly melted by increasing temperature and solidified by decreasing temperature. Thermoplastic materials are those materials the change of which upon heating is substantially physical rather than chemical. They are largely two- or one-dimensional molecule structures. Moreover, the compositions of this invention are flame retardant and halogen-free.

The compositions of this invention can also comprise relatively minor amounts of other polymers, e.g., less than 10, preferably less than 8 and more preferably less than 6, wt % of the composition. Exemplary other polymers include polyethers, polyamides, polycarbonates and the like. These polymer components can be incorporated to further enhance the overall property balance of the composition by contributing to burn performance, mechanical toughness, flexibility, or other key properties.

Compounding

Compounding of the compositions can be effected by standard equipment known to those skilled in the art. Examples of compounding equipment are internal batch mixers, such as a Banbury™ or Bolling™ internal mixer. Alternatively, continuous single, or twin screw, mixers can be used, such as Farrel™ continuous mixer, a Werner and Pfleiderer™ twin screw mixer, or a Buss™ kneading continuous extruder. The type of mixer utilized, and the operating conditions of the mixer, will affect properties of the composition such as viscosity, volume resistivity, and extruded surface smoothness.

A cable containing an insulation layer comprising a composition of this invention can be prepared with various types of extruders, e.g., single or twin screw types. These compositions should have extrusion capability on any equipment suitable for thermoplastic polymer extrusion. The most common fabrication equipment for wire and cable products is a single screw plasticating extruder. A description of a conventional single screw extruder can be found in U.S. Pat. No. 4,857,600. An example of co-extrusion and an extruder therefore can be found in U.S. Pat. No. 5,575,965. A typical extruder has a hopper at its upstream end and a die at its downstream end. Granules of the polymeric compound feed through a hopper into the extruder barrel, which contains a screw with a helical flight. The length to diameter ratio of extruder barrel and screw is typically in the range of about 15:1 to about 30:1. At the downstream end, between the end of the screw and the die, there is typically a screen pack supported by a breaker plate used to filter any large particulate contaminates from the polymer melt. The screw portion of the extruder is typically divided up into three sections, the solids feed section, the compression or melting section, and the metering or pumping section. The granules of the polymer are conveyed through the feed zone into the compression zone, where the depth of the screw channel is reduced to compact the material, and the thermoplastic polymer is fluxed by a combination of heat input from the extruder barrel, and frictional shear heat generated by the screw. Most extruders have multiple barrel heating zones (more than two) along the barrel axis running from upstream to downstream. Each heating zone typically has a separate heater and heat controller to allow a temperature profile to be established along the length of the barrel. There are additional heating zones in the crosshead and die assembles, where the pressure generated by the extruder screw causes the melt to flow and be shaped into the wire and cable product which typically moves perpendicular to the extruder barrel. After shaping, thermoplastic extrusion lines typically have a water trough to cool and solidify the polymer into the final wire or cable product, and then have reel take-up systems to collect long lengths of this product. There are many variations of the wire and cable fabrication process, for example, there are alternate types of screw designs such as barrier mixer or other types, and alternate processing equipment such as a polymer gear pump to generate the discharge pressure. The compositions outlined in this disclosure can typically be processed on any fabrication equipment that is suitable for extruding wire and cable compositions.

Another aspect of the invention provides an article. This includes a component comprising the present composition. In particular, the article includes a component composed of a composition as described herein.

In some embodiments, the article includes a metal conductor and a coating on this metal conductor to provide an "insulated" wire capable of electrical transmission of low voltage telecommunication signals or for a wide range of electrical power transmission applications. A "metal conductor," as used herein, is at least one metal component used to transmit either electrical power and/or electrical signals. Flexibility of wire and cables is often desired, so the metal conductor can have either a solid cross-section or preferentially can be composed of smaller wire strands that provide increased flexibility for the given overall conductor diameter. Cables are often composed of several components such as multiple insulated wires formed into an inner core, and then surrounded by a cable sheathing system providing protection and cosmetic appearance. The cable sheathing system can incorporate metallic layers such as foils or armors, and typically has a polymer layer on the surface. The one or more polymer layers incorporated into the protective/cosmetic cable sheathing are often referred to cable "jacketing". For some cables, the sheathing is only a polymeric jacketing layer surrounding a cable core. And there are also some cables having a single layer of polymer surrounding the conductors, performing both the roles of insulation and jacketing. The compositions can be used as any of the polymeric components in the full range of wire and cable products, including power cables and both metallic and fiber optic communication applications. The composition may be any composition as disclosed herein. Use includes both direct contact and indirect contact between the coating and the metal conductor. "Direct contact" is a configuration whereby the coating immediately contacts the metal conductor, with no intervening layer(s) and/or no intervening material(s) located between the coating and the metal conductor. "Indirect contact" is a configuration whereby an intervening layer(s) and/or an intervening material(s) is located between the metal conductor and the coating. The coating may wholly or partially cover or otherwise surround or encase the metal conductor. The coating may be the sole component surrounding the metal conductor. Alternatively, the coating may be one layer of a multilayer jacket or sheath encasing the metal conductor.

In another embodiment, the compositions can be used as a layer or component in fiber optic cables which incorporate optical fibers transmitting light energy. These cables are typically used in communication applications, and are capable of transmitting large quantities of data. For optic cable jacketing, the polymeric coating provides many of the same protective benefits as metallic based cables, providing a tough protective layer with good cosmetic appearance, and having any required level of burn resistance. For fiber optic cables, the electrical characteristics of the coating material may be less important.

In an embodiment, the article is a coated metal conductor. Nonlimiting examples of suitable coated metal conductors include flexible wiring such as flexible wiring for consumer electronics, a power cable, a power charger wire for cell phones and/or computers, computer data cords, power cords, appliance wiring material, and consumer electronic accessory cords.

The following examples illustrate various embodiments of this invention. All parts and percentages are by weight unless otherwise indicated.

SPECIFIC EMBODIMENTS

Example 1

Sample Compositions

This example demonstrates the synergistic effect of carbon black in a flame retardant composition. For this example, three flame resistant compositions are made according to the formulations shown in Table 1. The amounts listed in the table are weight percentages (wt. %) based on the total weight of the composition.

TABLE 1

Effect of Carbon Black on Flame Resistance

| | Example: | | |
|---|---|---|---|
| | -1 | -2 | -3 |
| Base Composition | | | |
| Dow TPU 2355-75A (adipate) | 34.91 | 34.91 | 34.91 |
| Elvax 40L-03 (40% VA, 3MI) | 11.28 | 11.28 | 11.28 |
| Elvax 265 (28% VA/, 3MI) | 7.52 | 7.52 | 7.52 |
| Amfine FP-2100J | 46.00 | 46.00 | 46.00 |
| Irgafox 168 | 0.10 | 0.10 | 0.10 |
| Irganox 1010 | 0.20 | 0.20 | 0.20 |
| DFDA-0038 Carbon Black Masterbatch | | | |
| Added as pellet blend with base (parts) | 1.00 | 3.00 | 5.00 |
| containing master batch resin (parts) | 0.60 | 1.80 | 3.00 |
| containing carbon black (parts) | 0.40 | 1.20 | 2.00 |
| 0.085" insulation diameter on 18AWG Stranded Conductor | | | |
| UL-94 VW-1 Wire Burn test | | | |
| # pass/# total | 0/3 | 2/3 | 3/3 |
| un-charred lendth below flag | 0.0 | 63.3 | 88.3 |

Pellethane® 2355-75A is an adipate-type thermoplastic polyurethane elastomer with a density of 1.19 g/cm$^3$ (ASTM D-792) and a melt index of 28 g/10 min (ASTM D-1238, 224° C./1.2 kg) available from The Lubrizol Corporation. Elvax® 40L03 is ethylene vinyl acetate (EVA) copolymer with a specific gravity of 0.966 g/cm$^3$ (ASTM D-792), a melt mass-flow rate (MFR) of 3 g/10 min (ASTM D-1238) and a vinyl acetate content of 40 wt %, available from E.I. DuPont de Nemours and Company. Elvax® 265 is ethylene vinyl acetate (EVA) with a specific gravity of 0.951 g/cm$^3$ (ASTM D-792), a melt mass-flow rate (MFR) of 3 g/10 min (ASTM D-1238) and a vinyl acetate content of 28 wt % available from E.I. DuPont de Nemours and Company. Amfine™ FP-2100J is a nitrogen-phosphorous based flame retardant. It is a white powder that decomposes above 300° C., and it has a nitrogen content of 20-23 percent and a phosphorous content of 18-21 percent. It is available from Amfine Chemical Corporation. Irgafos 168 (tris-(2,4-di-tert-butylphenyl)phosphite) is a phosphate type antioxidant available from Ciba Specialty Chemicals. Irganox 1010 ((1,3,5-trimethyl-2,4,6-tris(3,5-di-tert-butyl-4-hydroxybenzyl)benzene) is a hindered phenolic type antioxidant available from Ciba Specialty Chemicals. DFDA-0038 is a polyethylene based carbon black masterbatch incorporating 40% by weight fine particle carbon black.

The base composition is prepared by conventional mixing and heating to about 180° C. batch temperature on Banbury 1A pilot plant mixer with extruder/pelletizing system. The ingredients are weighed at the proper proportions to provide a nominal 38 lb batch weight providing a good mixer fill. A mixer rotor speed of about 80 RPM is used for the entire mixing cycle. All raw materials, both polymers and additives are charged at the beginning, with two ram raises to provide batch turnover at 140° C. and 170° C. The batch is dropped into the pelleting extruder when a 180° C. batch temperature is reached. This pelleted base material is then used as the starting point for the laboratory batch mixing to incorporate the carbon black masterbatch.

The final compositions are made by adding the base material and the specified loading of carbon black masterbatch to a Brabender lab mixer heated to a 180° C. bowl temperature, then fluxing and heating the melt to 180° C. The resulting melt mixed material is collected and cooled to room temperature. This material is then granulated and used for lab extrusion to prepare the insulated wire for burn testing. The insulated wire is extruded on a ¾" diameter Brabender laboratory plasticating extruder, equipped with a polyethylene type metering screw and a wire costing cross-head. The lab extruder is operated with a ramp barrel profile to about 180° C., and the screw RPM's are adjusted to provide an insulation extrusion output rate of about 3.0 meters/minute. A wire crosshead with a 0.085" wire costing die is used to apply the 0.085" finish diameter on nominal 0.046" diameter stranded copper conductor to produce the insulated wire sample for VW-1 burn testing.

The VW-1 burn test is performed on wire and cable product samples as detailed in the Underwriters Laboratory UL-94 testing standard. The VW-1 burn test is performed on a vertical specimen of the wiring product where a laboratory burner calibrated to a 500 watt flame energy level is applied at the base of the specimen as the ignition source in a series of five fifteen-second exposures. To pass this test, a wiring product sample needs to meet the following criteria: 1) the sample must be self-extinguishing within 60 seconds after the ignition source is removed, 2) it cannot exhibit flaming drip and 3) it cannot show fire propagation to the top of the specimen (i.e., does not burn a kraft paper flag installed at top of specimen). Since a wiring product is tested, key variables in the burn test are the product geometry and materials of construction. From a product geometry standpoint, it is typically more difficult to pass the VW-1 test at intermediate cross-sections of about 0.5 to 3 mm overall diameter than at smaller or larger cross-sections. This is because this intermediate size is small enough to be strongly heated and ignited (not a large heat sink), yet incorporates sufficient supply of cable material as fuel to support the vertical burn propagation after the ignition source is removed. The formulations of this example are designed to provide passing VW-1 burn in this most difficult range of cable product geometry. To better quantify the VW-1 burn test results, an extra parameter, "un-charred length" is measured as the distance in millimeters from the bottom of the kraft flag down to the first physical damage (ignores discoloration or soot deposits) on the specimen.

The VW-1 burn test is conducted on insulated wire composed of the specified insulation formulation concentrically extruded to a 0.085" finish diameter over a 0.046" diameter stranded copper wire (18 AWG; 41 strand conductor). From a fuel standpoint, the addition of the carbon black masterbatch adds polymer without additional flame retardant additive, and therefore would be expected to result in a weakened flame retardant performance, which is the result that would be obtained with most flame retardant compositions. But the data clearly show the benefit of carbon black as a burn performance synergist in this type of intumescent compound formulation. The formulation having a carbon black content of 2.0 wt. % (5.0% masterbatch) had a stronger burn performance than the formulation having a carbon black content of 1.2 wt. % (3.0% masterbatch), and the formulation having a carbon black content of 1.2 wt. % had a better burn performance than the formulation having a carbon black content of 0.40 wt. % (1.0% masterbatch), as quantified by the "uncharred length" of specimen remaining after the burn test. The 1.0% black masterbatch loading is a typical loading for coloring use only, while the higher masterbatch loadings are employed as the flame retardant synergist in this example.

Example 2

Sample Compositions

This example demonstrates the synergistic effect of silica, zinc oxide and titanium dioxide on a flame retardant composition. For this example, each composition was formulated from a polymer base according to the formulation shown in Table 2A.

Tables 2A and 2B show the effect of the various metal oxide burn synergists on a TPU-based composition incorporating ethylene-vinyl acetate co-resins and Adeka FP-2100J intumescent flame retardant additive. The amounts listed in Tables 2A and 2B are weight percentages based on the total weight of the composition.

TABLE 2A

| Thermoplastic TPU Based Intumescent "Base A" | |
|---|---|
| Dow TPU 2355-75A (adipate) | 40.12 |
| Elvax 40L-03 (40% VA, 3MI) | 7.08 |
| Reofos BAPP | 10.00 |
| Amfine FP-2100J | 42.50 |
| Irgafox 168 | 0.10 |
| Irganox 1010 | 0.20 |

Base A is prepared by conventional mixing and heating to about 180° C. batch temperature on Banbury 1A pilot plant mixer with extruder/pelletizing system. This "Base A" material is then used as base for laboratory batch mixing of the compositions shown in Table 2B.

Reofos BAPP is bisphenol A polyphosphate, a liquid intumescent flame retardant additive, available from Chemtura Corporation. BAPP, which is also known as BDP (bisphenol A diphosphate), is also available from other suppliers such as the Fyrolflex BDP grade from ICL Industrial Products, Ltd.

The final compositions were made by adding the base material and the specified additives to a Brabender lab mixer heated to a 180° C. bowl temperature, then fluxing and heating the melt to 180° C. The resulting melt mixed material is removed from the mixer and cooled to room temperature, then granulated, then used for lab extrusion to prepare a nominal 2.5 cm wide by 0.50 mm thick tape. The tape is extruded on a ¾" diameter Brabender laboratory plasticating extruder, using a polyethylene type metering screw, with a ramp barrel profile to about 180° C., and processing rate of about 3.0 meter/minute. A laboratory tape die with an 25×0.5 mm geometry shapes the tape which is air cooled on a take-off belt and collected. A similar lab extrusion with a wire coating cross-head is used to prepare insulated wire described below for burn testing.

Tensile testing of extruded tapes is conducted in accordance with the ASTM D-638 testing procedure, using a nominal Type IV dogbone specimen punched using a dogbone shaped cutter from the 25 mm wide extruded tape having a nominal 0.50 mm thickness. The tensile testing is performed was performed on an Instron Model xxxx Tensile Tester at a testing speed of 500 mm/minute with an initial jaw separation of 57.2 mm.

Elongation at break, or elongation to break, is the strain on a sample when it breaks. It usually is expressed as a percent. Elongation at break is measured in accordance with the ASTM D-638 testing procedure, using a nominal Type IV dogbone specimen cut from extruded tape having a nominal 0.50 mm thickness. The tensile testing is performed on an Instron Model xxx Tensile Tester at a 500 mm/minute testing speed with an initial jaw separation of 57.2 mm.

For the purposes of this disclosure, the secant modulus is measured in accordance with the ASTM D-638 testing procedure, using a nominal Type IV dogbone specimen cut from extruded tape having a nominal 0.50 mm thickness. The testing was performed at a 50 mm/minute testing speed with an initial jaw separation of 57.2 mm.

VW-1 testing is performed as previously described on insulation samples with a 2.16 mm (0.085") finish diameter, and a 18 AWG stranded copper conductor having a nominal 1.17 mm (0.046") diameter. The "uncharred" length measurement from this testing is the average of 3 repetitions of the VW-1 test and helps quantify the VW-1 test results. It can be seen in Table 2B that the specific metal oxide synergists show varying levels of efficacy at improving burn performance.

TABLE 2B

Effect of Flame-Retardant Synergists on TPU-Based Intumescent Composition

| | 2A (control) | 2B | 2C | 2D | 2E | 2F | 2G |
|---|---|---|---|---|---|---|---|
| Base Material "A" | 99.8 | 97.8 | 97.8 | 97.8 | 97.8 | 97.8 | 97.8 |
| Lovel 27(PPG); silica | | | | | | | 2.00 |
| Zeothix 265; silica | | | | | | 2.00 | |
| Kadox 911; zinc oxide | | | | | 2.00 | | |
| Kadox 930; zinc oxide | | | | 2.00 | | | |
| DuPont R104 TiO2 | | | 2.00 | | | | |
| DuPont R350 TiO2 | | 2.00 | | | | | |
| Irganox 1024 | 0.20 | 0.20 | 0.20 | 0.20 | 0.20 | 0.20 | 0.20 |
| Tensile Strength @ Peak (psi) | 1938 | 2230 | 1298 | 1590 | 1918 | 1547 | 1717 |
| Elongation @ Break (%) | 836 | 898 | 663 | 503 | 776 | 588 | 635 |
| 1% Secant Modulus (psi) | 3571 | 3702 | 4092 | 3777 | 3601 | 4468 | 4348 |
| 5% Secant Modulus (psi) | 3059 | 3136 | 3348 | 3069 | 3111 | 3510 | 3590 |
| VW-1; un-char length (mm) | 0.0 | 23.3 | 53.3 | 66.7 | 46.7 | 101.7 | 65.0 |
| VW-1; # pass/# total | 0/3 | 1/3 | 2/3 | 3/3 | 3/3 | 3/3 | 3/3 |
| VW-1; char thickness rank | 6.7 | 9.0 | 8.7 | 9.0 | 9.0 | 10.0 | 9.7 |

Example 3

UV Stable, Flame Retardant Compositions Based on a TPU/EVA Blend

This example demonstrates the dramatic benefit to UV stable color performance obtained from incorporation of very high titanium dioxide loadings into flame retardant composition. For this example, each composition was formulated from one of three polymer bases according to the formulation shown in Table 3. The amounts listed in the table are weight percentages (wt. %) based on the total weight of the composition.

TABLE 3

Base Materials

| Base Materials | Base #1 | Base #2 | Base #3 |
|---|---|---|---|
| Dow Polyurethane 2102-75A | 28.90 | 27.33 | 25.77 |
| Elvax 265 (28% VA/3MI) | 28.90 | 27.33 | 25.77 |
| Amfine FP-2100 J | 41.50 | 41.6 | 41.6 |
| Stabaxol P | 0.50 | 0.50 | 0.50 |
| Irganox 1010 | 0.20 | 0.20 | 0.20 |
| DuPont R350 $TiO_2$ | none | 3.04 | 6.16 |

Pellethane 2102-75A is polycarprolactone ester based thermoplastic TPU from the Lubrisol Corporation, with nominal 75 A shore hardness, and a melt flow rate of about 25 @ a 224° C./1.2 kg test condition. Stabaxol P is an aromatic carbodiimide antihydrolysis TPU stabilizer available from the RheinChiemie Corporation. The other additives have been previously described.

The base materials were prepared on a Banbury Type 1A batch mixing melt compounding line coupled to a melt fed extruder and underwater pelleting system. The mixer was operated with a bowl temperature of 180° C. and the composition was fluxed and mixed until a 180° C. batch temperature was reached and then discharged via slide gate into the melt fed extruder hopper.

As shown in Table 4, the base material was utilized to prepare five samples incorporating UV stabilizers and formulated to a light gray color. Samples 1 through 4 contained 1.77% by weight total pigment loading with this pigment system identified as Clariant Light Gray #1. Titanium Dioxide ($TiO_2$) was the major pigment component in the pigment mixture prepared by Clariant Corporation, with the pigment system also containing a low level of carbon black and color tints to provide a good spectral color match to the desired light gray hue. The 1.77% pigment level was identified as "1×" color, and is at the high end of typical pigment loadings used for this type of composition. Sample 5 incorporates a doubling of the pigment level to the 2× level to determine if this would benefit color stability during UV exposure. The UV additives used in this study were selected as good choices for a TPU based composition, and were formulated at a 1.0% weight loading for comparison. Ciba #1 is Tinuvin PUR 866 material, a proprietary mixture containing hindered amine and UV absorber components.

These compositions were injection molded at standard TPU molding conditions into 50×75 mm rectangular specimens for UV exposure. Following a baseline coloring measurement, the UV test specimens were then installed into a Ci65A Xenon arc Weather-Ometer instrument and given the prescribed 300 hours of UV light exposure providing an accelerated testing simulating direct sunlight through standard window glass. This testing was performed in accordance with the ASTM D4459 testing standard and also according to ASTM Practice 155 which provides supplemental detail on the xenon arc apparatus and calibration procedures. To provide the sunlight through window glass modeling, Type S borosilicate inner and Soda Lime outer filters were used, and the light source was calibrated to a 0.8±0.05 watt/$m^2$ intensity at the specified 420 nm wavelength calibration condition. The specified product qualification protocol was 300 hours of continuous UV light exposure without any water spray.

A Datacolor SF600CT color analysis instrument was used to measure color change of the specimens due to the UV exposure. The application requirement was a color change of less then 3.0ΔE measured and calculated according to the CIE 1994 method. This CIE 94' parameter calculates color change by comparison of color measurement before UV exposure to the color measurement following the specified UV exposure. Extra specimens were used to provide the interim measurements at 100 and 200 hours where this data is shown.

This initial study showed that none of the formulations provided the required UV stable color performance, with ΔE values ranging from 7.6 to 20.8 versus the requirement of ΔE<3.0. Samples 1 through 4 compared different UV additives systems while keeping the base formulation and colorant package constant. These specimens showed the anticipated result that selection of the UV stabilizer component is important to achieving the best result. These results also showed that it would be difficult to meet the required performance via UV stabilizer only. Comparison of Samples 4 and 5 provide a comparison of the 1× and 2× colorant levels with a constant base material and UV additive system. The 2× colorant loading provided a dramatic reduction in ΔE to 7.6 versus a ΔE of 16.5 with 1× colorant loading. The discovery of this unexpectedly large benefit via high loading of $TiO_2$ based pigments provided the means to meet the UV stable color target.

The same sample preparation and testing methodology was employed in a follow-up optimization study as summarized in Table 5. There was a small adjustment in the target light gray color, with the change identified as Clariant Gray #2. Another change was to separate the tinting colorants into a polyethylene based color masterbatch having a 50% pigment loading,

TABLE 4

Comparative Examples

| Component | Sample 1 Color: 1x | Sample 2 Color: 1x | Sample 3 Color: 1x | Sample 4 Color: 1x | Sample 5 Color: 2x |
|---|---|---|---|---|---|
| Base #1 | 97.23 | 97.23 | 97.13 | 97.23 | — |
| Base #2 | — | — | — | — | 95.46 |
| Clariant Light Gray #1 Colorant | 1.77 | 1.77 | 1.77 | 1.77 | 3.54 |
| UV Stabilizer Loading | 1.0 | 1.0 | 1.1 | 1.0 | 1.0 |
| UV Stabilizer | Ciba #1 | Ciba #2 | Ciba #3 | Clariant #1 | Clariant #1 |
| CIE'94; ΔE@100 hrs | 5.1 | 4.1 | 21.2 | — | — |
| CIE'94; ΔE@200 hrs | 8.4 | 8.1 | 21.4 | — | — |
| CIE'94; ΔE@300 hrs | 10.3 | 10.7 | 20.8 | 16.5 | 7.6 |
| Approximate $TiO_2$ Content (Wt %) | 1.6 | 1.6 | 1.6 | 1.6 | 3.2 | with $TiO_2$ comprising about 80% of the pigment in this masterbatch. Following these adjustments, the leading Sample 5 result from the initial optimization was repeated as Sample 6. The $TiO_2$/colorant levels are again doubled, from 2x to 4x, in Samples 7, 9 and 10 which further demonstrate the claimed invention of large UV stable color improvement via high $TiO_2$ based colorant levels.

TABLE 5

Inventive Samples

| Description: | Sample 6 Colorant: 2x | Sample 7 Colorant: 4x | Sample 8 Colorant: 2x | Sample 9 Colorant: 4x | Sample 10 Colorant: 4x |
|---|---|---|---|---|---|
| Base #2 | | 96.50 | | 96.50 | 96.50 |
| Base #3 | 97.75 | | 97.75 | | |
| UV Stabilizer | Clariant #1 | Clariant#1 | Ciba #1 | Ciba #1 | Ciba #2 |
| UV Stabilizer Loading | 1.00 | 1.00 | 1.00 | 1.00 | 1.00 |
| Clariant Colorant Light Gray #2; PE Based MasterBatch | 1.25 | 2.50 | 1.25 | 2.50 | 2.50 |
| CIE'94; ΔE@100 hrs | 2.5 | 1.83 | 3.48 | 1.5 | 2.24 |
| CIE'94; ΔE@200 hrs | 4.81 | 3.17 | 5.28 | 2.62 | 4.17 |
| CIE'94; ΔE@300 hrs | 5.32 | 3.27 | 6.74 | 2.76 | 4.58 |
| Approximate Total $TiO_2$ (Wt %)* | 3.2 | 6.4 | 3.2 | 6.4 | 6.4 |

*from both Clarieant masterbatch and direct $TiO_2$ addition to base materials

Polymer based color masterbatches are commonly used to simplify colorant addition versus the more complex process of adding low levels of individual pigments. In this case, the Clariant color masterbatch is a tinting concentrate containing all of the low level coloring pigments and some of the $TiO_2$ white pigment; with the balance of the $TiO_2$ was added directly to the composition. The direct $TiO_2$ addition avoiding the excessive amount of masterbatch that would needed to provide the full $TiO_2$ loading as color level was further increased. An excessive color masterbatch loading might otherwise compromise overall product performance by diluting the effective FR content with too much master batch resin and by causing other undesired property changes.

The evolution to high $TiO_2$ based colorant levels well beyond standard coloring practice provided the means to meet the UV stable color requirements for this composition, with sample #9 showing a ΔE value of 2.8 versus the requirement of ΔE<3.0. There are two pairings of 2x versus 4x color loading at constant base formulation and UV additive, Samples 6 vs. 7, and Samples 8 vs. 9, and both show the large ΔE color stability benefit from the higher loading of $TiO_2$ based colorant. Since standard color loadings would typically be at the 1x level or less, it is clear that this approach effectively provides a >2x improvement in UV color stability for the TPU based compositions as shown by these results.

Example 4

UV Stable, Flame Retardant Compositions Based on an Aromatic TPU and a Liquid Phosphate Flame Retardant This example demonstrates the UV stabilizing effect of titanium dioxide on a TPU based flame retardant composition incorporating a polyester type TPU with a flame retardant system comprised of aluminum trihydrate and resorcinol bis (diphenyl phosphate) also known as RDP. For this example, a supply of base material without colorant or UV additives was prepared on a 35 mm counter-rotating twin screw extruder. The resins were dried in a de-humidified hot air dryer at 80° C., except the ATH which was dried at high vacuum at 120° C. to reduce moisture levels. The raw materials were then mixed in a Henschel blender and fed as a single feed stream to the twin screw extruder. The twin screw extruder was operated with barrel cooling to maintain a maximum melt temperature of about 180° C. and the composition was recovered by a strand die/water bath/pelleting system. After compounding, the pellets of base compound were dried for 6 hours at 120° C. prior to subsequent lab mixing of the final compositions. The amounts listed in the table are weight percentages (wt. %) based on the total weight of the composition.

TABLE 6a

Base Compound

| Component | Wt % |
|---|---|
| Pellethane 2103-90A | 42.51 |
| J-42 ATH | 39.60 |
| Supresta RDP | 14.83 |
| AD-001 (PTFE-San) | 0.40 |
| DEN 438 (Epoxy Novolac) | 1.98 |
| Irgafox 168 | 0.09 |
| Irganox 1010 | 0.59 |

J-42 ATH is nominal 1 micron average particle size aluminum tri-hydrate flame retardant filler from Showa Denka Corporation.
Supresta RDP is resorsinol diphosphate, a liquid phosphate flame retardant filler from ICL Industrial Products, Ltd.
AD-001 is a PTFE-Santoprene additive used to increase melt viscosity/reduce drip tendency during burn testing.
DEN 438 is an epoxy-novolac from Dow Chemical and provides thermal stability and physical property enhancement.
Irgafox 168 is a phosphate type stabilizer from the Ciba Division of BASF.
Irganox 1010 is a hindered phenolic type antioxidant from the Ciba Division of BASF.

This base compound was then used in a nominal 250 gram Brabender laboratory batch mixer to prepare the final formulations for UV stability testing as shown in Table 6b. A total batch size of about 370 grams was used for all of the compositions. The mixing was performed with the mixer bowl temperature set to 160° C. with all materials added at the start. Initial fluxing was performed at a 25 RPM rotor speed. After fluxing, the mixer rotor speed was increased to 50 RPM and the mixing was ended when the material temperature reached 160° C.

The compositions were compression molded at 180° C. to prepare nominal 200×200×2 mm thick plaque specimens. These were cut using an arbor press to a 50×75 mm specimen size to be used for the UV age testing.

The UV aging and color stability testing was performed as previously described, with the ΔE value showing the comparative color stability among the samples for the prescribed UV aging period.

TABLE 6b

Final Formulations and Color Stability after UV Aging

| Component | Sample 11 2x color | Sample 12 4x color | Sample 13 6x color | Sample 14 4x color | Sample 15 6x color | Sample 16 4x color | Sample 17 6x color |
|---|---|---|---|---|---|---|---|
| Base Material | 94.77 | 90.55 | 86.32 | 89.55 | 85.32 | 90.38 | 86.56 |
| R350 TiO$_2$ | 2.98 | 5.95 | 8.93 | 5.95 | 8.93 | 5.95 | 8.93 |
| Clariant Light Gray #2; EVA-Based Tinting Masterbatch | 1.25 | 2.50 | 3.75 | 2.50 | 3.75 | 1.67 | 2.51 |
| Tinuvin XT 850 Powder | 0.50 | 0.50 | 0.50 | | | | |
| Tinuvin 328 Powder | 0.50 | 0.50 | 0.50 | | | | |
| Tinuvin PUR 866 | | | | 2.00 | 2.00 | | |
| Chimmasorb 119 | | | | | | 2.00 | 2.00 |
| Approximate TiO$_2$ Content* (Wt %) | 3.2 | 6.4 | 9.6 | 6.4 | 9.6 | 6.1 | 9.0 |
| CIE '94 ΔE 100 hrs | 6.69 | 4.63 | 4.77 | 1.72 | 1.40 | 2.88 | 2.06 |
| CIE '94 ΔE 200 hrs | 10.59 | 7.49 | 5.35 | 2.31 | 1.84 | 3.77 | 2.30 |
| CIE '94 ΔE 300 hrs | 13.38 | 10.29 | 7.58 | 2.97 | 2.34 | 4.44 | 2.87 |

*approximate total TiO$_2$ from Clariant color masterbatch and direct addition
Tinuvin XT 850 Powder is hindered amine UV stabilizer available from Ciba Division of BASF.
Tinuvin 328 Powder is benzotriazole type of UV absorber available from the Ciba Division of BASF.
Tinuvin PUR 866 is proprietary blend of UV stabilizers from the Ciba Division of BASF.
Chimmasorb 119 is hindered amine light stabilizer from the Ciba Division of BASF.

With the preferred UV stabilizer levels increased to 2.0% by weight, several of the samples with high TiO$_2$ loadings were able to achieve the targeted <3.0 ΔE value in the 300 hr UV stability test.

Table 7 provides some of the mechanical properties, measured as described in Examples 1 and 2, for inventive samples 14 and 15. They show a small and acceptable penalty in increased secant modulus via use of the higher color loading to achieve color stability.

TABLE 7

Mechanical Properties

| | Sample 14 | Sample 15 |
|---|---|---|
| Yield Strength (psi) | 1961 | 1966 |
| Tensile Strength @ Peak (psi) | 1966 | 1972 |

TABLE 7-continued

Mechanical Properties

| | Sample 14 | Sample 15 |
|---|---|---|
| Elongation @ Break (psi) | 352 | 339 |
| Time Based 1% Secant Modulus (psi) | 4596 | 4902 |

Although the invention has been described in considerable detail through the preceding description, drawings and examples, this detail is for the purpose of illustration. One skilled in the art can make many variations and modifications without departing from the spirit and scope of the invention as described in the appended claims.

What is claimed is:

1. A coating for a wire or cable comprising a color-stable, halogen-free, flame retardant composition, the composition comprising, based on the weight of the composition:
    (a) a thermoplastic elastomer consisting of a thermoplastic polyurethane and, optionally, an olefin-based polymer;
    (b) 5-60 weight percent of a phosphorus-based flame retardant;
    (c) at least 5 weight percent TiO$_2$; and
    (d) a UV stabilizer;
the composition having a CIE 94 ΔE of no greater than 3 after 300 hours of exposure to a xenon arc lamp according to ASTM-D-4459-06.

2. The composition of claim 1 in which the thermoplastic polyurethane comprises a polycarprolactone ester based thermoplastic polyurethane.

3. The composition of claim 1 comprising at least 9 weight percent TiO$_2$.

4. The composition of claim 3 in which the phosphorus-based flame retardant is a phosphoric acid ester.

5. The composition of claim 4 in which the thermoplastic polyurethane is an aromatic polyurethane.

6. The composition of claim 1 having a 5% secant modulus of no greater than 20,000.

7. The composition of claim 2, wherein the composition comprises up to 40% by weight percent of an olefin-based polymer.

8. The composition of claim 7 in which the olefin-based polymer is at least one of ethylene/acrylic acid (EAA), ethylene/methacrylic acid (EMA), ethylene/acrylate or methacrylate, ethylene/vinyl acetate (EVA), poly(ethylene-co-vinyltrimethoxysilane) copolymer, or a maleic anhydride- or silane-grafted olefin polymer.

9. A coated wire comprising an electrically conductive wire having a surface that is at least partially coated with the flame retardant composition of claim 1.

10. A method of making a coated wire, the method comprising coating at least a portion of the surface of an electrically conductive wire with the flame retardant composition of claim 1.

11. The composition of claim 1, wherein the composition comprises 20-85 weight percent thermoplastic polyurethane.

* * * * *